United States Patent [19]

Yamaguchi

[11] 4,012,593
[45] Mar. 15, 1977

[54] BIDIRECTIONAL REPEATER IN DATA TRANSMISSION SYSTEM
[75] Inventor: Taihei Yamaguchi, Yamato, Japan
[73] Assignee: Panafacom Limited, Japan
[22] Filed: Dec. 29, 1975
[21] Appl. No.: 644,509
[30] Foreign Application Priority Data
Dec. 29, 1974 Japan .................................. 50-965
[52] U.S. Cl. ............................................. 178/71 R
[51] Int. Cl.² ........................................ H04L 25/20
[58] Field of Search ............ 178/71 R, 71 N, 71 T, 178/70 R; 179/170 R, 170 NC

[56] References Cited
UNITED STATES PATENTS

| 3,647,966 | 3/1972 | Teurnier | 178/70 R |
| 3,673,326 | 6/1972 | Lee | 178/71 R |
| 3,832,489 | 8/1974 | Krishna | 178/71 R |

Primary Examiner—Thomas A. Robinson
Attorney, Agent, or Firm—Staas & Halsey

[57] ABSTRACT

Disclosed is a bidirectional repeater in a data transmission system in which a supervisor is connected to one end of a bidirectional bus having connected thereto a plurality of communication units and the bidirectional bus is extended through the bidirectional repeater. In the case of data transmission between the communication units or between one of the communication units and the supervisor, the bidirectional repeater relays signals without delay and without any erroneous operation even in the case of impulsive noise getting mixed in the signals and determines the data transmitting direction prior to data transmission.

8 Claims, 7 Drawing Figures

BIDIRECTIONAL REPEATER IN DATA TRANSMISSION SYSTEM

BACKGROUND OF THE INVENTION

1. Field of the Invention

This invention relates to a bidirectional repeater in a data transmission system, and more particularly to a bidirectional repeater in a data transmission system of the type having a plurality of communication units connected to a common bus, which utilizes the fact that each of the communication units requests the exclusive use of the common bus for data transmission and sends out a response signal when permitted, and is adapted such that information transfer means is actuated by the response signal to transfer the information transmitted after the response signal.

2. Description of the Prior Art

In the data transmission system in which a plurality of communication units are connected to a common bus, the number of communication units connectable to the bus is limited for maintaining good impedance matching state of the line. In order to connect more communication units, it is necessary to insert a bidirectional repeater in the line.

In conventional bidirectional repeaters of this kind, its information transmitting direction is determined dependent upon which of its terminals receives a signal earlier than the other. However, since the information transmitting direction is determined after detection of the arrival of the signal at the repeater, a delay of the signal increases and, in the case of impulsive noise getting mixed in the signal, the determination of the information transmitting direction cannot be controlled correctly.

SUMMARY OF THE INVENTION

One object of this invention is to provide a bidirectional repeater in a data transmission system which utilizes the fact that each communication unit requests the occupation of a common bus prior to data transmission in such a data transmission system, and is adapted so that the data transmitting direction is changed over by a response signal transmitted from the communication unit in response to an occupation permitting signal, thereby to relay the information following the response signal without delay.

Another object of this invention is to provide a bidirectional repeater which controls the determination of the data transmitting direction without causing any erroneous operation even if impulsive noise is mixed in the signal.

Briefly stated, in a data transmission system in which a data transmission supervisor is connected to one end of a bidirectional bus and more than one communication unit is connected to the bidirectional bus extending through the repeater connected to the other end thereof, and in which, when one of the communication units effects the transmission of information with another communication unit, the supervisor permits the occupation of the bidirectional bus and the one communication unit transmits a response signal to the supervisor and then starts the transmission of information to the other unit, the repeater according to this invention comprises first communication information transfer means for transferring communication information from the bus on the side of the supervisor to the bus on the opposite side therefrom through the repeater, second communication information transfer means for transferring communication information from the bus on the opposite side to the bus on the side of the supervisor, and transmitting direction switching means for normally actuating the first communication information transfer means and, upon detection of the response signal from the communication unit connected to the bus on the opposite side, stopping the actuation of the first communication information transfer means and actuating the second communication information transfer means.

DESCRIPTION OF THE PREFERRED EMBODIMENTS

Figure 1:
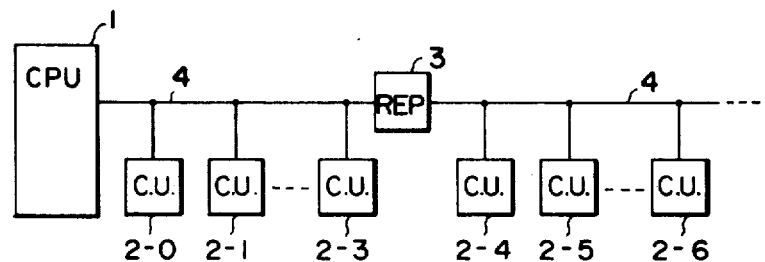
FIG. 1 is a block diagram of a data transmission system to which this invention is applied.

In FIG. 1, reference numeral 1 indicates a supervisor for the transmission of information, which is a central processing unit (CPU). Reference numerals 2-0 to 2-6 designate communication units, which may be memories, channel units or other central processing units. Reference numeral 3 identifies a repeater and 4 represents a common bus.

Such an information processing system is known in which the plurality of central processing units, memories or channel units 2-0 to 2-6 are connected to the common bus 4, the supervisor 1 is connected to one end of the bus 4 and each of the units 2 communicates with another one of them after obtaining permission to occupy the common bus 4 from the supervisor 1. In FIG. 1, the central processing unit 1 performs both its function and the function of a supervisor but need not alway serve such a double purpose. Various input/output devices are connected to the common bus 4 through input/output control units or channel units.

In such a data transmission system, the number of communication units connectable with the line is limited so as to maintain good impedance matching state of the line and, in this case, let it be assumed that the number of communication units connected is, for example, less than 16. For connecting more communication units, it is necessary to insert the bidirectional repeater 3 in the line. In this case from the viewpoint of the supervisor 1, the repeater 3 can be regarded as exactly the same unit as the communication units 2 connected to the bus 4 such as channel units, memories or the like. Accordingly, it is possible to branch out the bus 4 from the repeater 3 and to connect a desired number of communication units up to 16.

Figure 2:
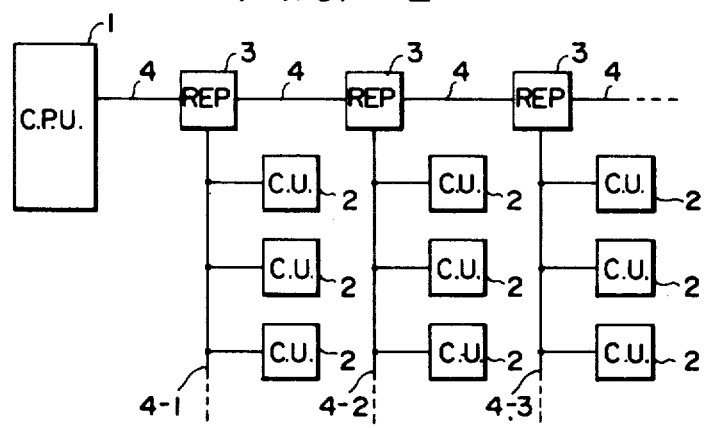
FIG. 2 is a block diagram of a data transmission system developed from the system of FIG. 1.

FIG. 2 shows a data transmission system developed by the above-mentioned method. Each of buses 4-1, 4-2 and 4-3 extending from respective repeaters 3 has connected thereto, for example, less than 16 central processing units, memories, channel or input/output control units 2 and various input/output devices are connected through the channel or input/output control units.

In the prior art, direction of transmission is not predetermined at all times because it is necessary to give the "bidirectional" property to the repeater 3. Accordingly, in the case of data transmission between the communication unit 2 on the side of the supervisor 1 or the supervisor 1 itself and the communication unit 2 on the opposite side therefrom through the repeater 3, it is necessary to determine the direction of transmission at the instant when a signal has reached either one of the terminals of the repeater 3.

Figure 3:
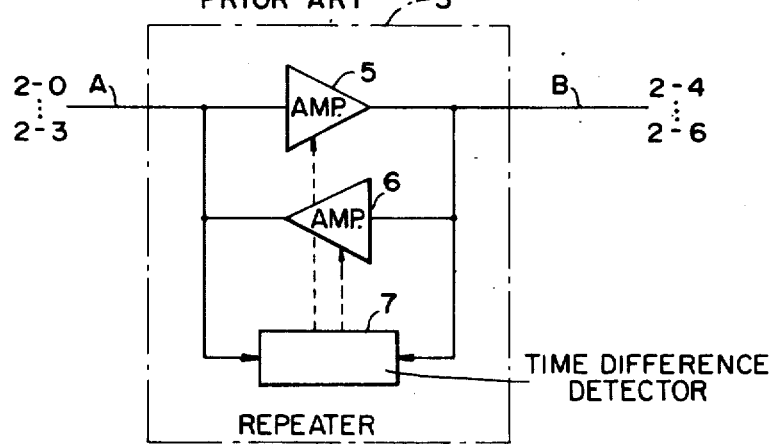
FIG. 3 is a block diagram illustrating one example of a conventional repeater.

That is, in the conventional method, as shown in FIG. 3, two amplifiers 5 and 6 of different directions of transmission are provided and one of the directions of transmission is selected by earlier one of the signals applied to terminals A and B of the repeater 3 from the two units demanding data transmission therebetween. The information from the supervisor 1 or the communication unit 2 on the side of the supervisor 1 to the communication unit 2 on the opposite side of the repeater 3 therefrom is transferred through the transfer amplifier 5 and the information in the direction opposite to the above is transferred through the transfer amplifier 6. The operations of these transfer amplifiers 5 and 6 are held under the control of a time difference detector 7. The time difference detector 7 detects which of the terminals A and B receives the signal eariler than the other and actuates either one of the amplifiers 5 and 6 correspondingly.

With this method, the direction of transmission is determined after the signal has arrived at the repeater 3, so that although a high-speed operation is required, a delay of the signal is increased by the delay time of the circuit operation and a further delay of the signal is required to provide for enhanced accuracy of the deciding operation. If the abovesaid delay time is not sufficient, even where short-time noise gets mixed in the signal, the time difference detector 7 responds to the noise to determine the direction of transmission resulting in an erroneous operation.

To solve such a problem, in the present invention, based on the fact that each communication unit 2 transmits to the supervisor 1 a request signal for the occupation of the common bus 4 prior to the transmission of information and transmits a response signal when permitted, the transmitting direction of the repeater 3 is determined by the response signal. In such a case, the repeater 3 is normally set in the direction of transmitting information from the side of the supervisor 1 and when abovesaid response signal is generated, the repeater 3 is switched to the opposite direction.

Figure 4:
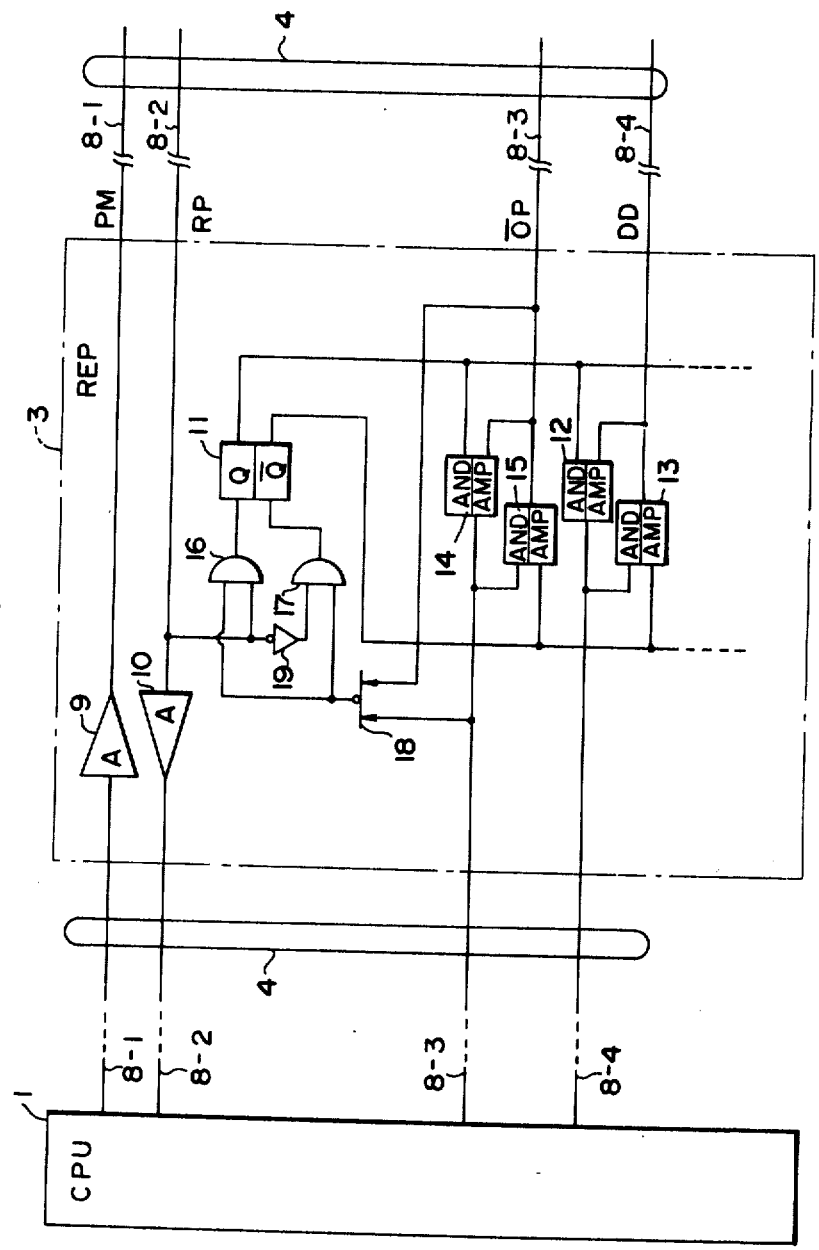
FIG. 4 shows the construction of the principal part of a repeater of this invention.

FIG. 4 shows the principal part of this invention. In FIG. 4, reference numerals 1, 3 and 4 correspond to those in FIG. 1. Reference numeral 8-1 indicates a permitting signal line; 8-2 designates a response signal line; 8-3 identifies a transmission indicating line; 8-4 represents an information signal line; 9 and 10 denote amplifiers; 11 shows a flip-flop; 12 refers to an AND circuit, which is a second communication information transfer means; 13 indicates an AND circuit, which is a first communication information transfer means; 14 to 17 identify AND circuits; 18 denotes a NOR circuit; and 19 represents a NOT circuit. Assume that the AND circuits 12 to 15 serve as amplifiers, too.

In normal conditions, a signal $\overline{Q}$ of the flip-flop 11 has a logic "1" and the AND circuits 13 and 15 are in the on state to permit the transmission of information from the side of the supervisor 1.

In the case where one communication unit transmits information under such conditions, it requests the supervisor 1 for the permission of the occupation or exclusive use of the common bus. This may be achieved through the response signal line 8-2. The supervisor 1 transmits a permitting signal over the signal line 8-1. In response to the permitting signal, the communication unit transmits a response signal over the signal line 8-2. In the repeater 3, since the NOR circuit 18 is initially of the logic 1 (if an indicating signal is already applied to the signal line 8-3 from another unit, the NOR circuit 18 is of a logic "0"), the AND circuit 16 is enabled by the output of NOR circuit 18 and the response signal on line 8-2, and the flip-flop 11 is set.

By the above, the AND circuits 12 and 14 are put in the on state and the AND circuits 13 and 15 are put in the OFF state. That is, the transmitting direction of the repeater 3 is determined to be leftward in FIG. 4. At this time, the communication unit demanding the transmission of information transmits an information signal over the signal line 8-4 and, at the same time, transmits over the signal line 8-3 a transmission indicating signal indicative of the occupation of the bus. Since the transmission indicating signal turns on the AND circuit 14, the NOR circuit 18 provides the logic 0 and even after the abovesaid response signal has disappeared, the AND circuit 17 will not be enabled. Thus, the flip-flop 11 is held in its set state and the AND circuits 12 and 14 are retained in their on state. And when the information signal is transmitted over the signal line 8-4, the transmitting direction of the repeater 3 is already changed over and the transmission of the information signal is continued.

Upon completion of the transmission of the information signal, the communication unit renders the transmission indicating signal logic 0, so that the NOR circuit 18 produces an output of logic 1 again to turn on the AND circuit 17, thus resetting the flip-flop 11. That is, the AND circuits 13 and 15 are moved to and continue to be in the on state so that the information from the side of the supervisor 1 may be transmitted in the rightward direction.

Thus, the repeater of this invention is composed of first communication information transfer means (for example, the AND gate 13 in FIG. 4) for transferring the communication information from the bus on the side of the supervisor to the bus on the opposite side of repeater 3 therefrom, second communication information transfer means (for example, the AND gate 12 in FIG. 4) for transferring the communication information from the bus on the opposite side of repeater 3 from the supervisor to the bus on the side of the supervisor, and transmitting direction switching means (for example, the flip-flop 11, the AND gates 16 and 17, the NOR circuit 18 and the NOT circuit 19 in FIG. 4) for actuating the abovesaid first communication information transfer means in the normal state but actuating the abovesaid second communication information transfer means upon detection of a response signal from a communication unit connected to the bus on the opposite side of repeater 3 from the supervisor.

In FIG. 4, the transmission indicating signal indicative of the occupation of the bus is shown to be transmitted from the communication unit but it may also be transmitted from the supervisor 1, the central processing unit or the like.

Figure 5:
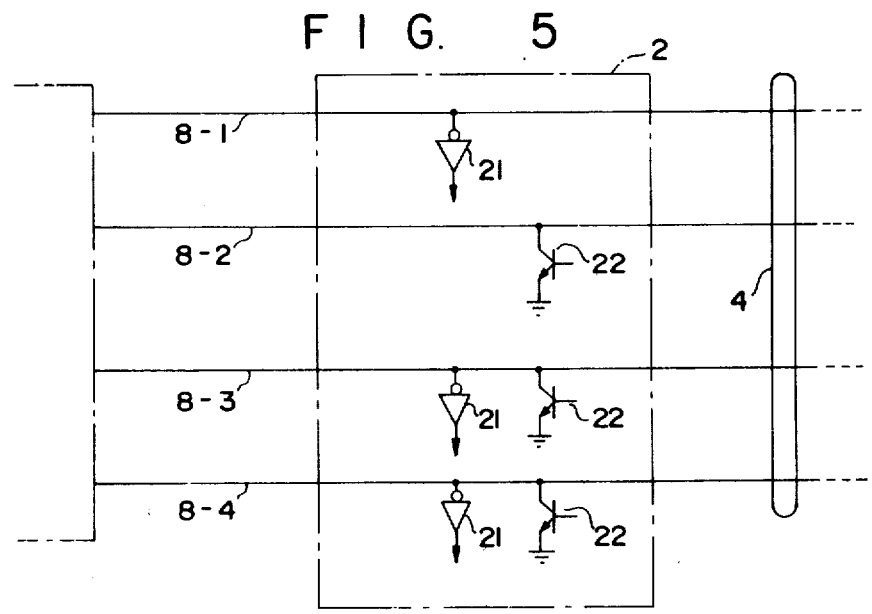
FIG. 5 shows the construction of the principal part of a communication unit according to this invention.

FIG. 5 shows the construction which is connected to the right-hand side of the construction depicted in FIG. 4, illustrating the principal part of one desired communication unit 2. Since the permitting signal line 8-1 is supplied only with a signal from the side of the supervisor 1, it is provided only with an input terminal. Further, since the response signal line 8-2 is supplied only with a signal from the communication unit 2, it is provided only with an output terminal. However, the transmission indicating signal line 8-3 and the information signal line 8-4 are required to have the functions of both transmission and reception. An input terminal of each of these signal lines has connected thereto a NOT circuit 21 serving as a high-impedance amplifier, too. When a signal is transmitted over the signal line, the NOT circuit 21 produces an output of the logic 0, by which the signal is transferred to the channel unit, a memory or the like in the communication unit 2.

An output terminal of each of the signal lines 8-3 and 8-4 has connected thereto, for example, a transistor 22. While no transmission is effected, the transistor 22 is normally in the off state to hold the signal line to be of the logic 0 of high level potential. To put the signal line in the state of the logic 1 of low level potential for transmission, the transistor 22 is turned on. By turning on the transistor 22 of a desired one of the communication units 2 while holding the transistors of the other communication units 2 in the off state, a signal of the logic 1 is transmitted to all of the other communication units.

In a typical example of the data transmission system of this invention, as shown in FIG. 1, a central processing unit is used as the supervisor 1 and each repeater 3 connected to the bidirectional bus 4 has connected thereto a plurality of, for example, less than 16 communication units 2, i.e. memories, channel units, central processing units or input/output control devices, and the bidirectional bus 4 can be extended to the extent of about 50m. Of course, the data transmission system of this invention can also be used as a usual data transmission system in which the bidirectional bus having the supervisor 1 at one end is extended out in the open and many communication units 2 hold the bus 4 in common.

Figure 6:
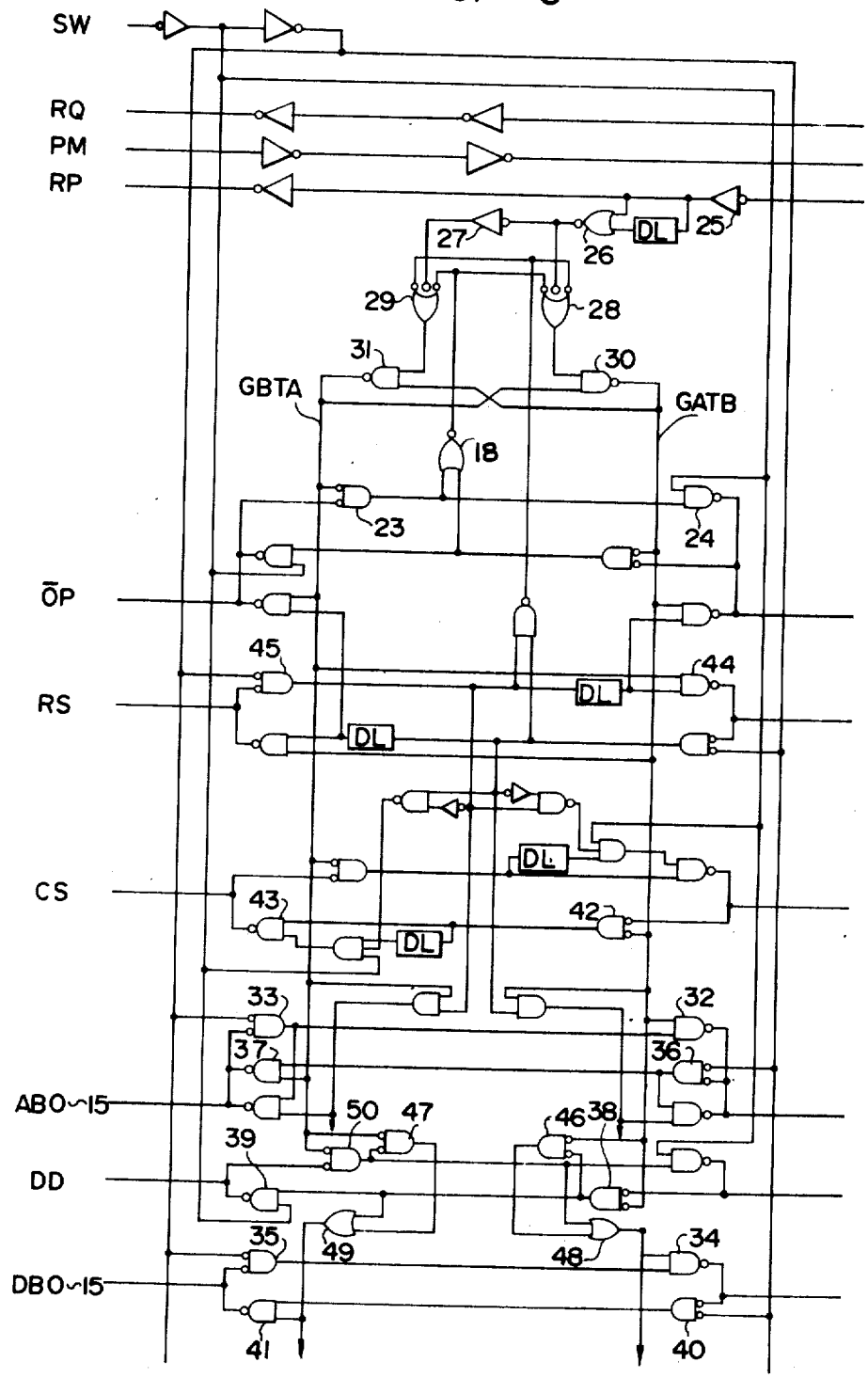
FIG. 6 is a diagram of the concrete construction of the repeater, illustrating one example of this invention.

FIG. 6 shows the concrete construction of the repeater in accordance with one embodiment of this invention. In this embodiment, the supervisor 1 is a central processing unit. With reference to the time chart shown in FIG. 7, a description will be given of the operation of the repeater in the case where a channel unit CH1 requests the supervisor 1 for permission of the occupation of the bus 4 for the transmission of information with another channel unit CH2 while a channel unit CH3 occupies the bus 4.

In FIG. 6, reference character SW indicates a switching signal line, which has the function of separating the stage following the repeater; RQ designates a bus occupation requesting signal line; PM identifies an occupation permitting signal line; RP denotes a response signal line; OP represents a bus occupation indicating signal line; RS shows a line for a data transfer response signal which is transmitted upon completion of the transfer of information; CS refers to a line for a data transfer instruction signal indicative of an instruction to start the information transfer; AB0 to AB15 indicate 16 address buses; DD designates a line for a data direction signal indicative of the direction of data transmission; DB0 to DB15 denote 16 data buses; DL identifies delay circuits; and GATB and GBTA represent gate buses. Reference numerals 30 and 31 indicate NAND gates making up a latch circuit.

Assume, for example, that an occupation indicating signal $\overline{OP}$ is transmitted from one channel unit CH3 on the left of the repeater and a level L or the logic 1 is transmitted to the right-hand bus through gates 23 and 24.

At this time, a request signal RQ is applied from another communication unit (the channel unit CH1) on the right of the repeater to the supervisor (a central processing unit) through the repeater.

In the absence of any other request, the supervisor provides a permitting signal PM in response to the request signal RQ. The channel unit CH1 stops the request signal RQ and transmits a response signal RP to the supervisor and, at the same time, supervises the occupation indicating signal $\overline{OP}$ transmitted from another communication unit CH3.

Even if the response signal RP is applied at the level L from the right-hand side of the repeater, while the occupation indicating signal $\overline{OP}$ is at the level L, the outputs from NAND gates 28 and 29 are at a level H and the state of the flip-flop formed with the gates 30 and 31 remains unchanged. For example, the gate bus GATB is held at the level H and the output from the NAND gate 31, that is, the gate bus GBTA is held at the level L. Under such conditions, in the address buses AB0 to AB15 and the data buses DB0 to DB15, signals of the level L are transferred from left to right through gates 33 and 32 and gates 35 and 34, respectively, but no signals are transferred in the opposite direction, i.e. from right to left.

Figure 7:
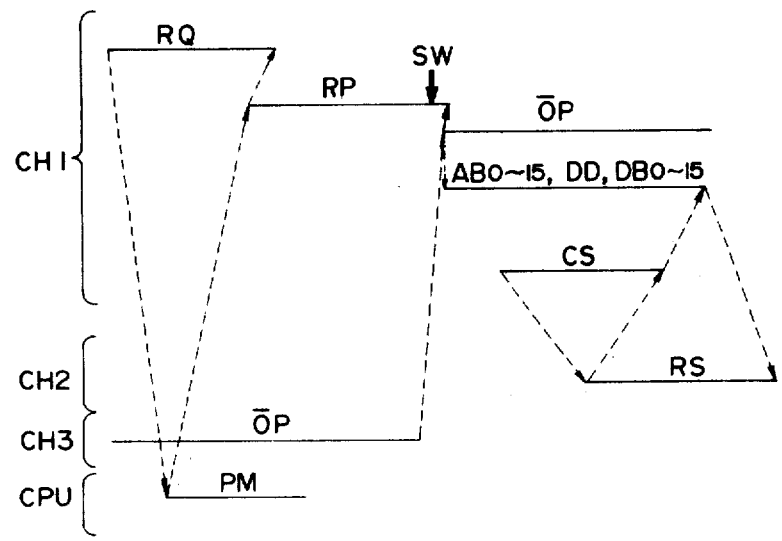
FIG. 7 is a time chart of data transmitting operations according to this invention.

When the occupation indicating signal $\overline{OP}$ transmitted from another communication unit CH3 is stopped, the channel unit CH1 detects it and stops the transmission of the response signal RP but instead transmits the occupation indicating signal $\overline{OP}$ and, at the same time, transmits address signals AB0 to AB15, a data direction signal DD, a transfer instruction signal CS and, if necessary, data DB0 to DB15. Each communication unit is given an address number peculiar thereto. The channel unit CH2 having detected the address of its own and the instruction signal CS immediately reads and receives the data DB0 to DB15 in accordance with the data direction signal DD, or transmits the data DB0 to DB15 and, at the same time, transmits the transfer response signal RS to indicate completion of the data transfer. That is, the data transfer instruction signal CS is transmitted in the same direction as an address signal AB, the data direction signal DD and the response signal RP but a data direction opposite to that of the address signal AB and the response signal RP. However, the direction of transmission of the data DB0 to DB15 is not always only the same direction as the address signal AB and their direction signal DD and the output from the latch circuit. For example, when the data DB0 to DB15 are transmitted in the same direction as the address signal AB, the data direction signal DD is of the logic 1, and when they are transmitted in the opposite direction to the address signal AB, the data direction signal DD is of the logic 0. FIG. 7 shows the case where the data direction signal DD is of the logic 1, that is, the case of the data DB0 to DB15 being transmitted from the channel unit CH1.

In FIG. 6, where the response signal RP from the channel unit CH1 is input from the right-hand side and where the occupation indicating signal $\overline{OP}$ or the data transfer response signal RS is being transmitted from another communication unit CH3, the latch circuit retains such state that the gate buses GATB and GBTA are respectively at the level H and at the level L. However, in the case where the response signal RP is being transmitted from the right-hand unit, when the occupation indicating signal $\overline{OP}$ and the data transfer response signal RS disappear, the latch circuit is reversed, with the result that the gate buses GATB and GBTA are respectively altered to the level L and the level H. When the occupation indicating signal $\overline{OP}$ has become of the level L again, even if the response signal RP disappears, the above state is retained unchanged. In this case, the transmitting direction is switched at the instant SW in FIG. 7 and, in the address buses AB0 to AB15, the data direction signal line DD and the data buses DB0 to DB15, the gates 36, 37, 38, 39, 40 and 41 are turned on and the signals of the level L are transferred from right to left and no signals can be transferred from left to right. In the data signal lines DB0 to DB15, the signals of the level L are sometimes transferred from left to right in accordance with the data direction signal DD and this is determined by the control operation of the gates 38 and 46 to 50.

The transfer instruction signal CS is transferred from right to left through the gates 42 and 43 and the transer response signal RS is transferred from left to right through gates 45 and 44. And when the channel unit CH1 receives the transfer response signal RS, the transfer instruction signal CS being transmitted from the channel unit CH1 is stopped and then the address signal AB and the data direction signal DD are stopped, after which, by the completion of the data signal DB, the transfer response signal RS being transmitted from the channel unit CH2 is stopped. In this case, if one of the units on the left-hand side transmits the response signal RP, no switching occurs and the previous state is retained.

The delay circuits DL are provided for time adjustment to ensure the logical operation.

As has been described in the foregoing, according to this invention, by utilizing the transmission of the signal that a communication unit response to the permission of occupation of the common bus even while another communication unit occupies the bus, the transmitting direction of the repeater is determined prior to the start of data transmission, so that no delay is caused in data transmission. Further, since the logical operation has sufficient time, it is possible to easily form a circuit which can be expected to perform accurate operations even if noise is mixed. And while an information signal is transmitted, its direction of transmission is retained and returned to the original one upon completion of the transmission.

It will be apparent that many modifications and variations may be effected without departing from the scope of the novel concepts of this invention.

What is claimed is:

1. In a data transmission system comprising a bidirectional bus, a data transmission supervisor which is connected to one end of said bidirectional bus, and more than one communication unit connected to the bidirectional bus at the other end thereof remote from said supervisor; wherein, when one of the communication units issues a request signal requesting the transmission of information with another communication unit, said supervisor issues a permission signal permitting the occupation of said bidirectional bus, and wherein said one communication unit thereupon transmits a response signal to said supervisor and then starts the transmission of information, a repeater disposed in said bidirectional bus between said one end and said other end thereof, said repeater comprising:
   first communication information transfer means for transferring communication information along the bidirectional bus from said one end to the other end;
   second communication information transfer means for transferring communication information along the bidirectional bus from said other end to the one end; and
   transmitting direction switching means coupled to said communication units and operatively associated with said first and second communication information transfer means for normally actuating the first communication information transfer means to permit communication from said one end to said other end and, upon detection of the response signal from the communication unit connected to the bus on said other end, for stopping the actuation of the first communication information transfer means and for actuating the second communication information means to permit communication from said other end to said one end.

2. The repeater according to claim 1, wherein said more than one communication unit includes more than one memory, channel unit or other central processing unit connected to the bidirectional bus, said data transmission supervisor being a central processing unit.

3. The repeater according to claim 1, wherein said first communication information transfer means includes an information logic gate having an output connected to said communication unit via a data direction line, and having two inputs, one connected to said central processing unit via an information line and the other connected to said transmitting direction switching means, and a transmission indicating logic gate having an output connected to said communication unit via a transmission indicating line, and two inputs, one connected to said central processing unit and the other connected, in common with said other input of said information logic gate, to said transmitting direction switching means.

4. The repeater according to claim 3 wherein said information logic gate and said transmission indicating logic gate are AND gates.

5. The repeater according to claim 3 wherein said transmission direction switching means is a flip-flop device having a reset output connected to said other input of said information logic gate and to said other input of said transmission indicating logic gate.

6. The repeater according to claim 1, wherein said second communication information transfer means includes an information logic gate having an output connected to said central processing unit via an information line and having two inputs, one connected to said communication unit via a data direction line and the other connected to said transmitting direction switching means, and a transmission indicating logic gate having an output connected to said direction switching means and two inputs, one connected to said communication unit via a transmission indicating line and the other connected, in common with said other input of said information logic gate, to said direction switching means.

7. The repeater according to claim 6 wherein said information logic gate and said transmission indicating logic gates are AND gates.

8. The repeater according to claim 6 wherein said transmission direction switching means is a flip-flop device having a set output connected to said other input of said information logic gate and to said other input of said transmission indicating logic gate.

* * * * *